(12) United States Patent
Lee et al.

(10) Patent No.: US 10,180,231 B2
(45) Date of Patent: Jan. 15, 2019

(54) MULTI-USE AUXILIARY LIGHT

(71) Applicant: LG DISPLAY CO., LTD., Seoul (KR)

(72) Inventors: Jung Hyoung Lee, Daejeon (KR);
Jong Seok Kim, Daejeon (KR); Hye Cho Shin, Daejeon (KR); Seung Chul Oh, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 71 days.

(21) Appl. No.: 15/508,433

(22) PCT Filed: Sep. 3, 2014

(86) PCT No.: PCT/KR2014/008250
§ 371 (c)(1),
(2) Date: Mar. 2, 2017

(87) PCT Pub. No.: WO2016/035906
PCT Pub. Date: Mar. 10, 2016

(65) Prior Publication Data
US 2017/0284627 A1   Oct. 5, 2017

(51) Int. Cl.
*F21S 8/08*     (2006.01)
*F21V 3/02*     (2006.01)
(Continued)

(52) U.S. Cl.
CPC   *F21V 3/02* (2013.01); *F21L 4/00* (2013.01); *F21S 8/032* (2013.01); *F21S 8/036* (2013.01);
(Continued)

(58) Field of Classification Search
CPC ..... F21L 4/00; F21L 4/025; F21L 4/04; F21V 1/14; F21V 1/143; F21V 1/16; F21V 1/17; F21V 1/20; F21V 1/22; F21V 3/02; F21V 5/006; F21V 14/02; F21V 14/025; F21V 14/06; F21V 14/065; F21V 14/08;
(Continued)

(56) References Cited

U.S. PATENT DOCUMENTS 6,666,563 B2 * 12/2003 Brown ...................... F21S 8/00
                                                    362/190
7,368,307 B2 *  5/2008 Cok ..................... H01L 51/0096
                                                    257/E33.059
(Continued)

FOREIGN PATENT DOCUMENTS

CN        201836675 U     5/2011
CN        202040639 U    11/2011
(Continued)

*Primary Examiner* — Jason M Han
(74) *Attorney, Agent, or Firm* — Dentons US LLP

(57) ABSTRACT

Disclosed is a multipurpose assistance lamp in which a lighting unit includes a transparent film and a casing plate, which have a curved surface, respectively, and are disposed on a front surface and a back surface of an OLED lighting sheet having a curved surface, a rotary body is coupled to one end portion of the lighting unit so as to support the lighting unit, and a circuit part and a battery for operating the OLED lighting sheet are provided in a base that is hingedly coupled to the rotary body, thereby reducing or minimizing a thickness by adopting an OLED as a light source, and providing light having improved brightness.

9 Claims, 8 Drawing Sheets

(51) Int. Cl.
*F21S 8/00* (2006.01)
*F21S 9/02* (2006.01)
*F21V 21/096* (2006.01)
*F21V 21/30* (2006.01)
*F21L 4/00* (2006.01)
*F21V 17/10* (2006.01)
*F21V 21/14* (2006.01)
*F21Y 115/15* (2016.01)
*F21Y 107/00* (2016.01)

(52) U.S. Cl.
CPC .............. *F21S 9/02* (2013.01); *F21V 17/107* (2013.01); *F21V 21/096* (2013.01); *F21V 21/0965* (2013.01); *F21V 21/14* (2013.01); *F21V 21/30* (2013.01); *F21Y 2107/00* (2016.08); *F21Y 2115/15* (2016.08); *Y02B 20/36* (2013.01)

(58) Field of Classification Search
CPC ...... F21V 14/085; F21V 17/02; F21V 17/105; F21V 17/107; F21V 21/0965; F21V 21/14; F21V 21/145; F21Y 2115/15; H05B 33/0896; H05B 33/10; H05B 33/12; H01L 51/5234
See application file for complete search history.

(56) References Cited

U.S. PATENT DOCUMENTS

| | | | |
|---|---|---|---|
| 8,783,898 | B2 | 7/2014 | Coleman et al. |
| 2003/0193795 | A1 | 10/2003 | Brown |
| 2005/0094394 | A1 | 5/2005 | Padiyath |
| 2011/0249425 | A1 | 10/2011 | Aurongzeb |
| 2012/0201038 | A1 | 8/2012 | Birnstock et al. |
| 2012/0268956 | A1 | 10/2012 | Jin |
| 2013/0188335 | A1 | 7/2013 | Marche |
| 2017/0311410 | A1 | 10/2017 | Oh et al. |

FOREIGN PATENT DOCUMENTS

| | | |
|---|---|---|
| CN | 202469506 U | 10/2012 |
| JP | 2009-026650 A | 2/2009 |
| JP | 2014-41764 A | 3/2014 |
| JP | 3212075 U | 8/2017 |
| KR | 10-1030383 B1 | 4/2011 |
| KR | 20-2012-0001737 U | 3/2012 |
| KR | 10-2012-0119476 A | 10/2012 |
| TW | 200526068 A | 8/2005 |
| TW | M438844 U | 10/2012 |
| WO | 2010/134002 A1 | 11/2010 |

* cited by examiner

[Figure 1]
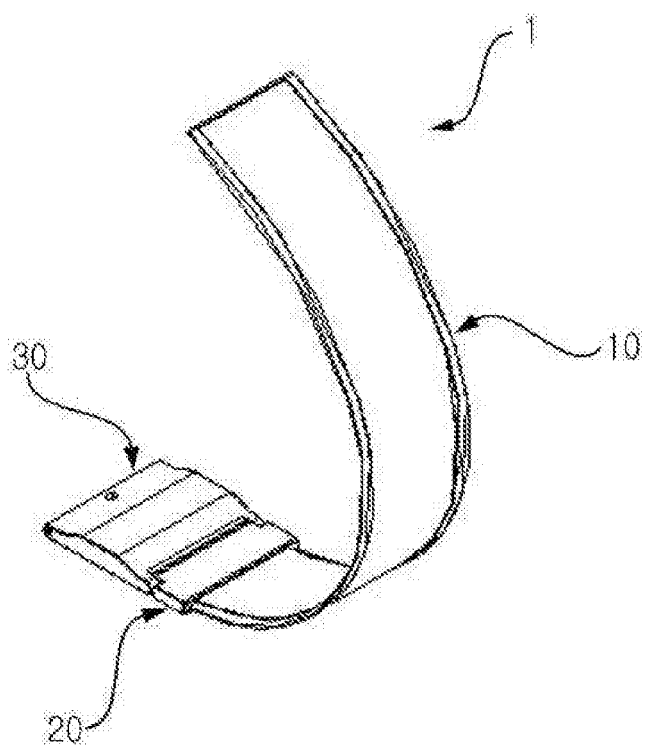

[Figure 2]
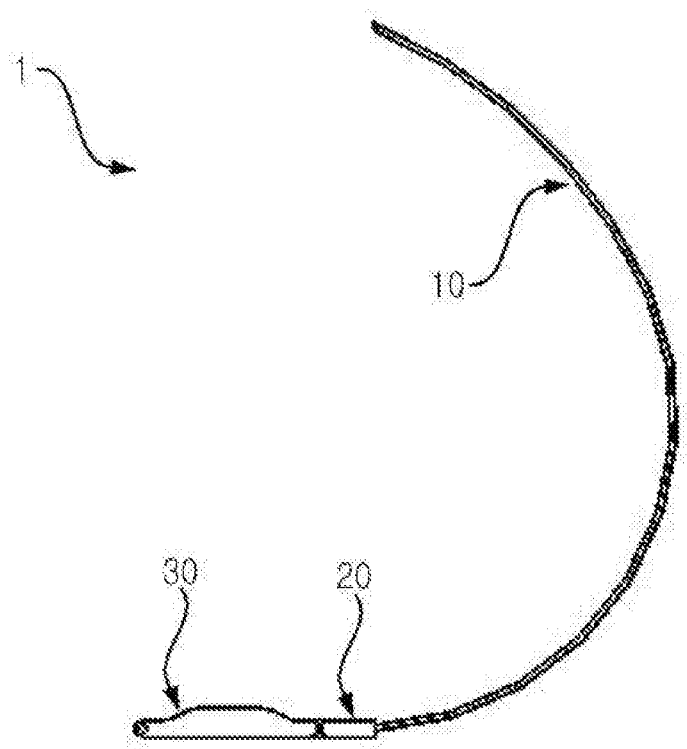

[Figure 3]
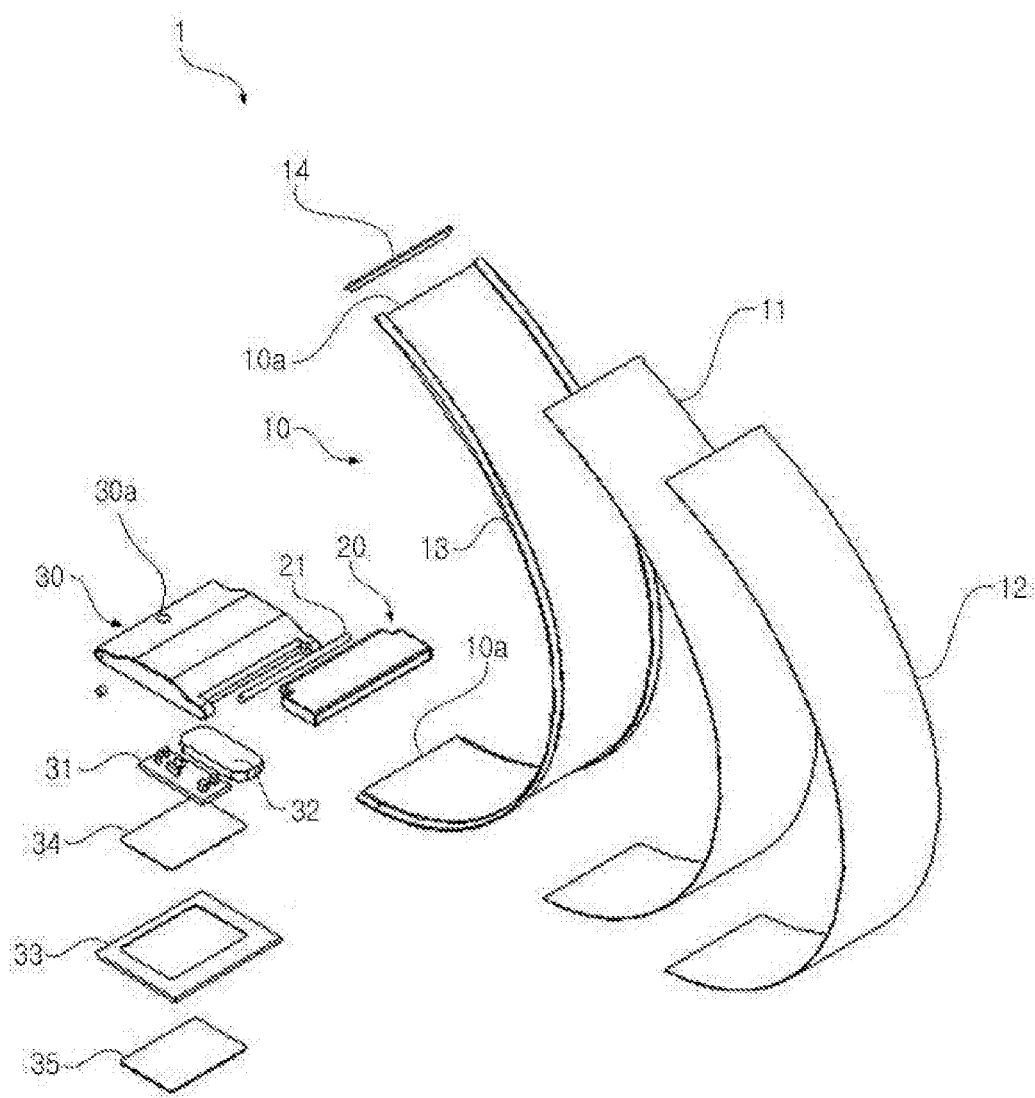

[Figure 4]
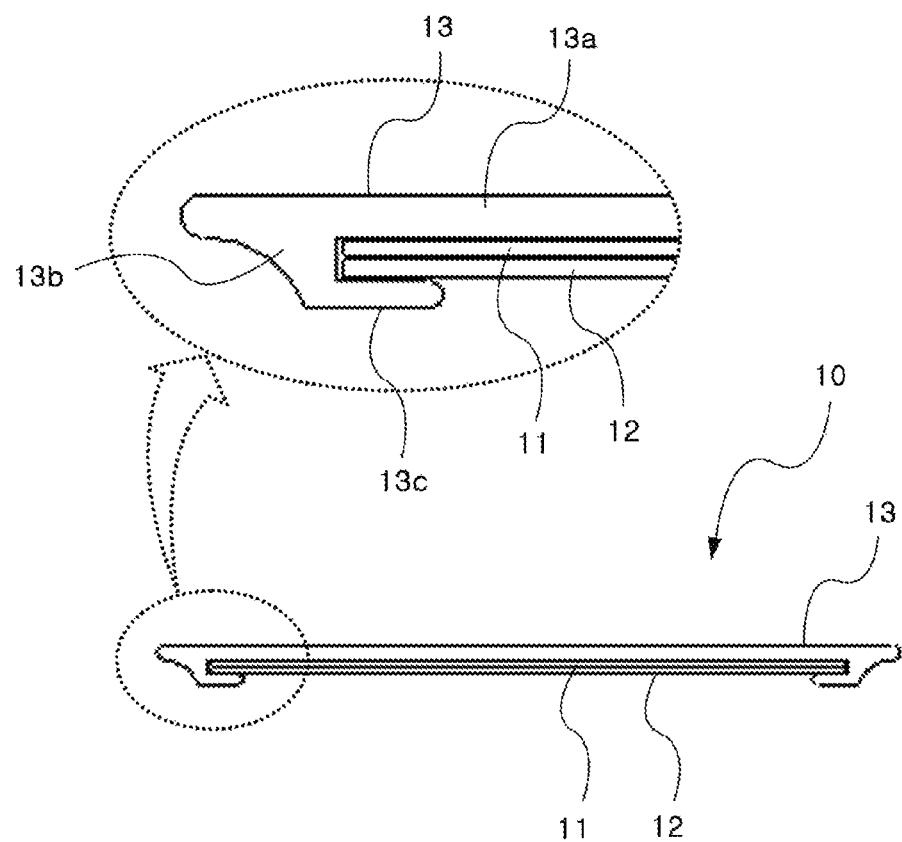

[Figure 5]
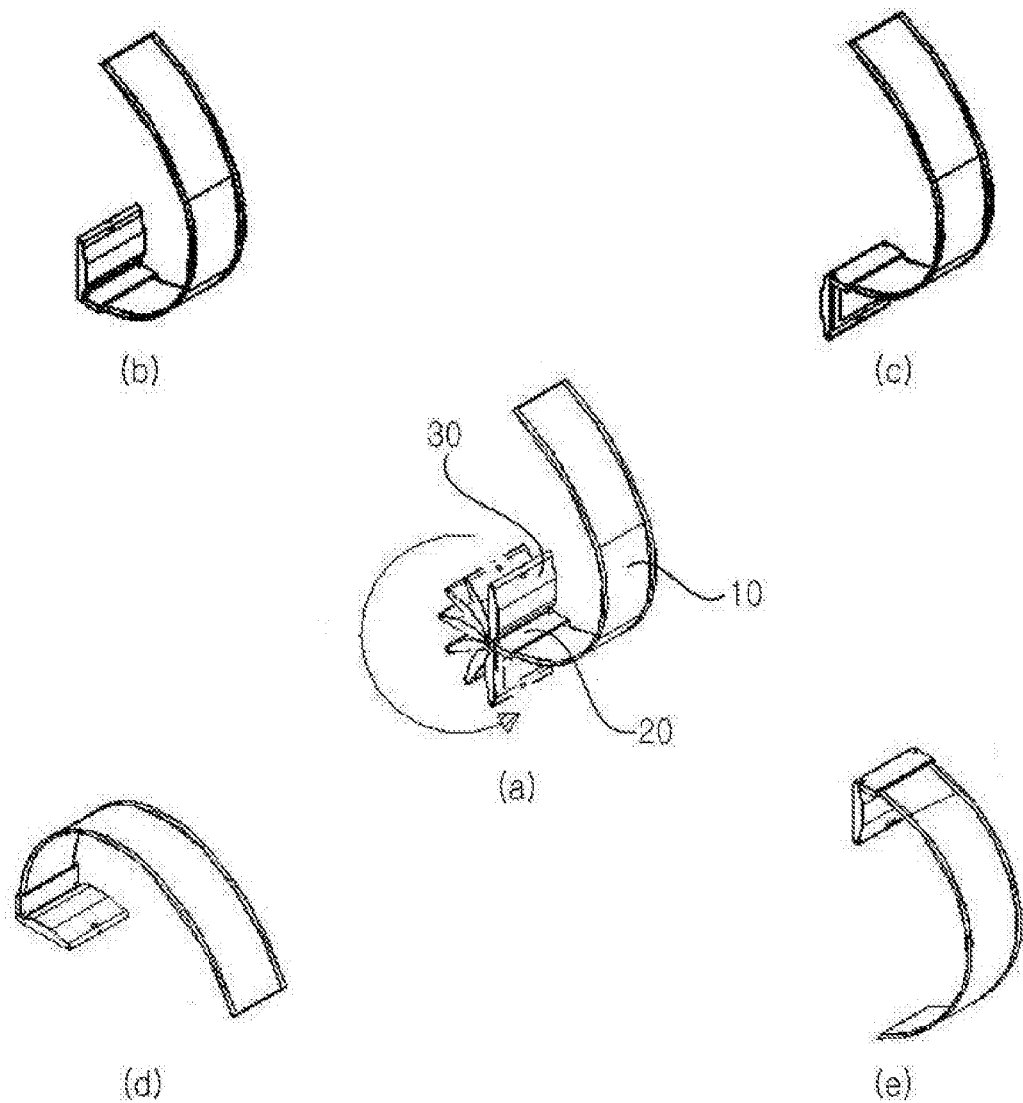

[Figure 6]
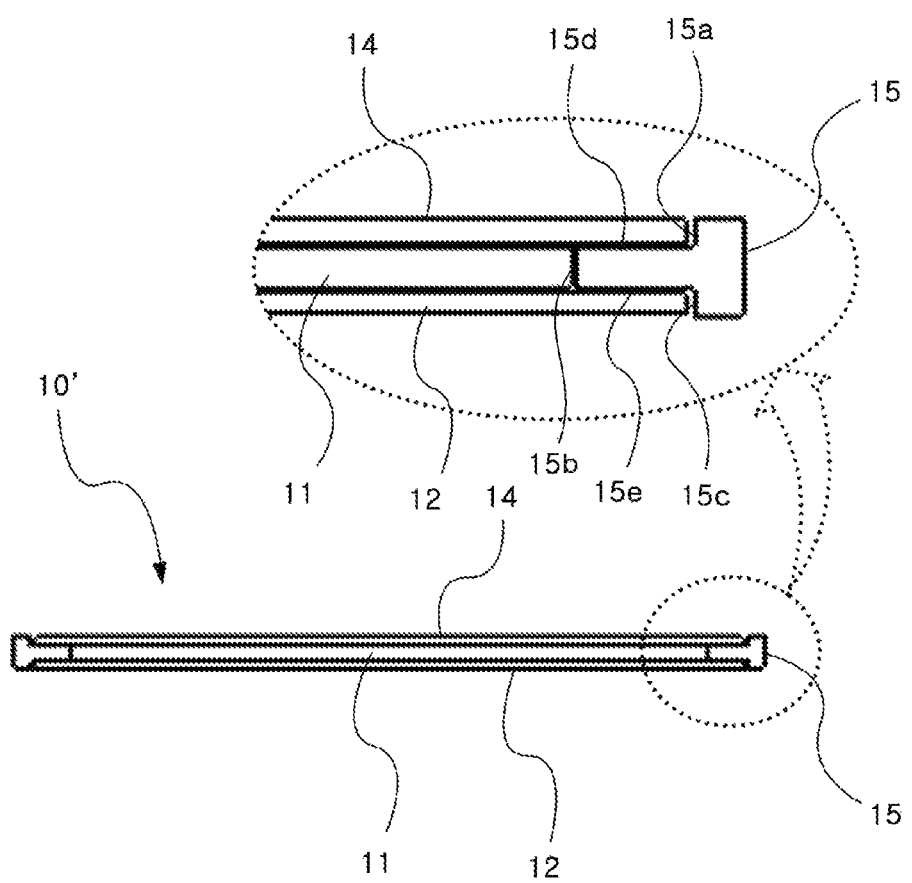

[Figure 7]
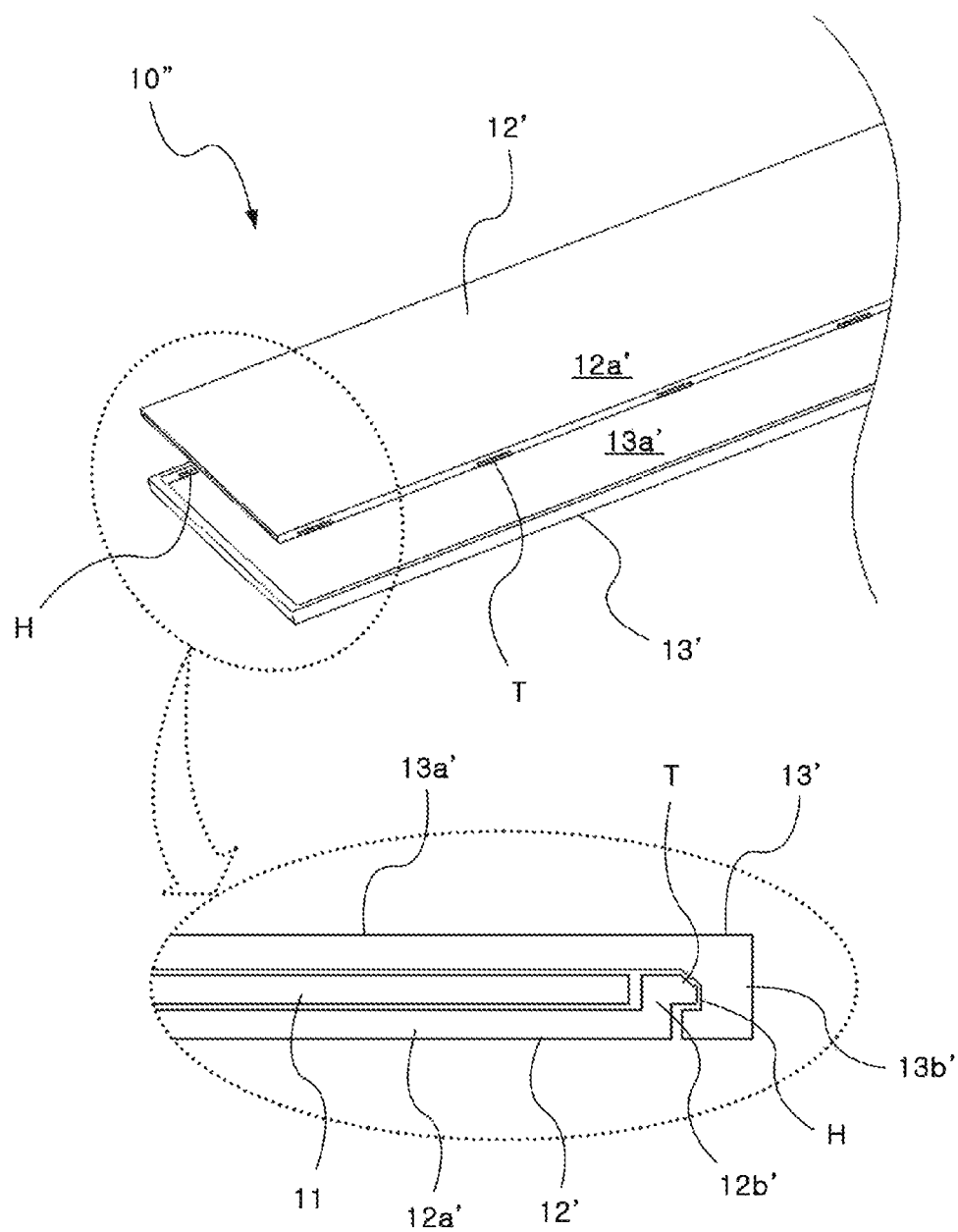

[Figure 8]
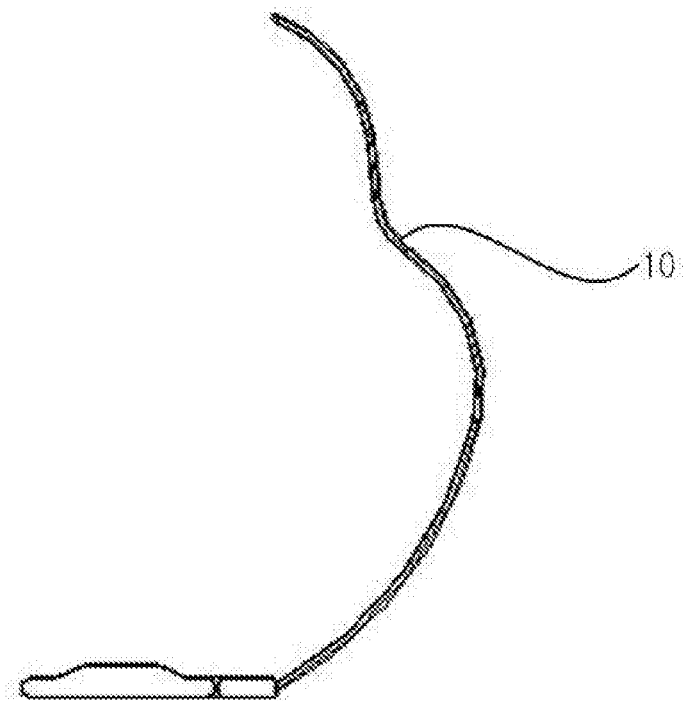

MULTI-USE AUXILIARY LIGHT

CROSS REFERENCE TO RELATED APPLICATION

This application is a National Stage Application of International Application No. PCT/KR2014/008250, filed on Sep. 3, 2014, which is hereby incorporated by reference in its entirety for all purposes as if fully set forth herein.

TECHNICAL FIELD

The present invention relates to a lamp, and more particularly, to a multipurpose assistance lamp in which a lighting unit includes a transparent film and a casing plate, which have a curved surface, respectively, and are disposed on a front surface and a back surface of an OLED lighting sheet having a curved surface, a rotary body is coupled to one end portion of the lighting unit so as to support the lighting unit, and a circuit part and a battery for operating the OLED lighting sheet are provided in the base that is hingedly coupled to the rotary body, thereby reducing or minimizing a thickness by adopting an OLED as a light source, and providing light having improved brightness.

BACKGROUND ART

A lamp according to the related art, which is installed in a bedroom or a living room inside a building, has a structure fixedly mounted on a wall surface or a ceiling. As a result, it may be impossible to move the lamp, and it may be sometimes impossible to position the lamp at a desired location.

Accordingly, embodiments of the present invention are directed to a multipurpose assistance lamp which may serve to perform a lighting function by mounting the multipurpose assistance lamp at various locations inside a building as desired by a user. Of course, such a multipurpose assistance lamp may be used for leisure purposes, such as for use on a camping or fishing trip.

A portable assistance lamp according to the related art such as a lantern may have similar aspects to a multipurpose assistance lamp according to an embodiment of the present invention. However, such a portable assistance lamp according to the related art is a typical lamp used inside a building at the time of emergency such as power failure, and therefore, is different from a multipurpose assistance lamp according to an embodiment of the present invention.

Meanwhile, a filament type bulb has been used as a portable assistance lamp according to the related art, but as new lighting means have recently been developed, products adopting new and various lighting means such as an LED light-emitting diode have been launched. In particular, an organic light-emitting diode (OLED), which is being developed most recently, has advantages in terms of high brightness, thin structure, and bendability, and thus, the organic light-emitting diode is applied to various image devices such as a TV set.

Accordingly, a multipurpose assistance lamp according to an embodiment of the present invention may use an OLED as a lighting means, which has high brightness and thin structure, and thus, may present more improved brightness, and be slimmer and more elegant in design than the portable assistance lamp according to the related art.

DISCLOSURE

Technical Problem

An aspect of the present invention has been made in an effort to provide a multipurpose assistance lamp which includes a thin lighting unit by combining a thin film type OLED lighting sheet, a transparent film, and a casing plate, thereby reducing or minimizing thickness and improving brightness.

Another aspect of the present invention has been made in an effort to provide a multipurpose assistance lamp which includes a lighting unit capable of changing a radius of curvature by using an OLED lighting sheet and a transparent film having flexibility as a light source of the lighting unit.

Technical Solution

An exemplary embodiment of the present invention provides a multipurpose assistance lamp including: a lighting unit which has an OLED lighting sheet having a curved surface, a transparent film having a curved surface that is in surface-to-surface contact with a front surface of the OLED lighting sheet while being stacked on the front surface of the OLED lighting sheet, and a casing plate having a curved surface that accommodates and supports the OLED lighting sheet and the transparent film using left and right edges in a state in which the casing plate is in surface-to-surface contact with a back surface of the OLED lighting sheet; a rotary body which is coupled to one end portion of the lighting unit and supports the lighting unit; and a base which is rotatably hingedly coupled to the rotary body, and accommodates therein a circuit part and a battery for operating the OLED lighting sheet.

Here, the casing plate may include a back cover portion which is in surface-to-surface contact with the back surface of the OLED lighting sheet, side protruding end portions which vertically protrude from both surfaces of the back cover portion which face each other, to support the OLED lighting sheet and the transparent film at sides of the side protruding end portions, and guide arm portions which are extended inward from the side protruding end portions so as to be parallel with a front surface of the back cover portion, and in contact with and support surfaces at edges of the transparent film.

In this case, the lighting unit may form free end portions which are both end portions in a longitudinal direction which are exposed to the outside as it is, such that a finishing plug may be fitted with and coupled to the other end portion opposite to the one end portion coupled to the rotary body so as to prevent the OLED lighting sheet and the transparent film accommodated in the casing plate from being exposed to the outside.

Alternatively, the casing plate may include a back cover portion which is in surface-to-surface contact with the back surface of the OLED lighting sheet, and side frame portions which are attached to both edges of the back cover portion which at least face each other, and vertically protrude toward the front surface, and are in contact with and support respective edges of the OLED lighting sheet and the transparent film at inner sides of the side frame portions toward a front surface of the back cover portion.

In this case, in the side frame portion, a first vertical end portion which is in direct contact with and supports a side edge of the back cover portion, a second vertical end portion which is in direct contact with and supports a side edge of the OLED lighting sheet, and a third vertical end portion which is in direct contact with and supports a side edge of the transparent film may be sequentially formed.

In this case, the side frame portion may further have a first horizontal end portion which is formed between the first vertical end portion and the second vertical end portion, and attached to the edge of the front surface of the back cover portion, and a second horizontal end portion which is formed between the second vertical end portion and the third vertical end portion, and attached to the edge of the back surface of the transparent film.

Alternatively, the transparent film may include a front cover portion that is in surface-to-surface contact with the front surface of the OLED lighting sheet, and side end portions which vertically protrude from both side surfaces of the front cover portion which face each other, to support the OLED lighting sheet at sides of the side end portions, and the casing plate may include a back cover portion which is in surface-to-surface contact with the back surface of the OLED lighting sheet, and side protruding end portions which vertically protrude from both side surfaces of the back cover portion which face each other, to support the side end portions at sides of the side protruding end portions.

In this case, the side end portion of the transparent film may have a plurality of catching projections that protrudes in a longitudinal direction thereof, and the side protruding end portion of the casing plate may have catching recessed portions formed at positions corresponding to the plurality of catching projections.

Meanwhile, the base may have a magnetic body provided on a back surface thereof so that the base is attached to an outside article.

In this case, the magnetic bodies may be attached to the inside and the outside of the back surface of the base, and the outside magnetic body may be detachably provided on the back surface.

Advantageous Effects

As described above, a multipurpose assistance lamp according to an embodiment of the present invention may have more improved brightness than an assistance lamp according to the related art by making a lighting unit thin by combining an OLED lighting sheet, a transparent film, and a casing plate, and may be slimmer and more elegant in design than the assistance lamp according to the related art.

In addition, the rotary body integrally coupled to the lighting unit is rotatably hingedly coupled to the base, such that a state in which the lighting unit is vertically or horizontally rotated may be maintained in accordance with a surface to which the base is attached, and by a shape of the lighting unit having a curved surface, the multipurpose assistance lamp may have a configuration suitable to use a mood lamp in a bedroom or a living room inside a building.

Such a multipurpose assistance lamp according to an embodiment of the present invention may be conveniently used at a desired position for leisure purposes such as a camping or fishing trip.

In addition, in a case in which components are attached by existing screws, a double-sided tape, or the like when a lighting unit is assembled according to the related art, its volume and thickness may increase, the number of working processes may also increase, and defect rate may become high. On the other hand, a lighting unit according to an embodiment of the present invention is assembled by a simple method of fitting an OLED lighting sheet and a transparent film into a casing plate or inserting the OLED lighting sheet and the transparent film into the casing plate in a sliding manner, thereby reducing volume and thickness as well as reducing the number of working processes and reducing defect rate during assembly.

Furthermore, due to characteristics of an OLED, a multipurpose assistance lamp according to an embodiment of the present invention may provide light close to natural light that may not be implemented by an existing filament type bulb, LEDs, and the like, and electrical power consumption may also be greatly decreased, thereby implementing an environmentally-friendly multipurpose assistance lamp.

In addition, an OLED lighting sheet may be used in a three-dimensionally curved shape by bending the OLED lighting sheet, as described above, and as a result, a lighting unit having various curved shapes such as a concave or convex shape, or a shape having a multiple curved surface, may be implemented to meet various design needs.

DESCRIPTION OF DRAWINGS

FIG. 1 is a perspective view of a multipurpose assistance lamp according to a first exemplary embodiment of the present invention.

FIG. 2 is a side view of the multipurpose assistance lamp of FIG. 1.

FIG. 3 is an exploded perspective view of the multipurpose assistance lamp of FIG. 1.

FIG. 4 is a cross-sectional view of a lighting unit that is a constituent element of the multipurpose assistance lamp of FIG. 1.

FIG. 5 is a perspective view illustrating examples of use of the multipurpose assistance lamp of FIG. 1.

FIG. 6 is a cross-sectional view of a lighting unit that is a constituent element of a multipurpose assistance lamp according to a second exemplary embodiment of the present invention.

FIG. 7 is a cross-sectional view of a lighting unit that is a constituent element of a multipurpose assistance lamp according to a third exemplary embodiment of the present invention.

FIG. 8 is a side view of a multipurpose assistance lamp according to a fourth exemplary embodiment of the present invention.

ILLUSTRATED EMBODIMENTS

As illustrated in FIGS. 1 and 2, a multipurpose assistance lamp 1 according to a first exemplary embodiment of the present invention includes a lighting unit 10 which has a thin-plate shape having an overall curved surface, a rotary body 20 which is coupled to a lower end portion of the lighting unit 10 and supports the lighting unit 10, and a base 30 which is coupled to one end portion of the rotary body 20.

As illustrated in FIG. 3, the lighting unit 10 includes an OLED lighting sheet 11 in a thin film as a lighting means, and includes a transparent film 12 which is in a surface-to-surface contact with a front surface of the OLED lighting sheet 11 while being stacked on a front surface of the OLED lighting sheet 11. The transparent film 12 allows the light generated from the OLED lighting sheet 11 to pass therethrough, and serves to protect the OLED lighting sheet 11 from external impact.

In addition, the lighting unit 10 further includes a rectangular casing plate 13 which accommodates and supports the OLED lighting sheet 11 and the transparent film 12.

As illustrated in FIG. 4, the casing plate 13 accommodates and supports the OLED lighting sheet 11 and the transparent film 12 using left and right edges of the casing plate 13 in a state in which the casing plate 13 is in a surface-to-surface contact with a back surface of the OLED lighting sheet 11.

Specifically, the casing plate 13 includes a back cover portion 13a which is in a surface-to-surface contact with a back surface (upper surface in FIG. 4) of the OLED lighting sheet 11, side protruding end portions 13b which vertically protrude from both side surfaces of the back cover portion 13a which oppose each other, and guide arm portions 13c which are extended inward from the side protruding end portions 13b so as to be parallel with a front surface of the back cover portion 13a.

The side protruding end portions 13b support the OLED lighting sheet 11 and the transparent film 12, which are vertically stacked, at sides of the side protruding end portions 13b, and the guide arm portions 13c are in contact with and support surfaces (bottom surfaces in FIG. 4) at edges of the transparent film 12, such that the OLED lighting sheet 11 and the transparent film 12 are accommodated and supported together in internal spaces which are formed by the guide arm portions 13c and the back cover portion 13a.

The casing plate 13 may be implemented by extrusion forming of aluminum, and the lighting unit 10 may be assembled in a way that the OLED lighting sheet 11 and the transparent film 12 are fitted into the casing plate 13 from one end portion in a longitudinal direction of the casing plate 13.

Meanwhile, as illustrated in FIG. 3, a finishing plug 14 having a thin rod shape is fitted into and coupled to an upper free end portion 10a of both upper and lower free end portions 10a of the casing plate 13 into which the OLED lighting sheet 11 and the transparent film 12 are fitted, thereby reducing or preventing the OLED lighting sheet 11 and the transparent film 12, which are fitted into and accommodated in the casing plate 13, from being exposed to outside through the free end portion 10a.

The lower free end portion 10a is inserted into and fastened to the rotary body 20.

An end portion of the rotary body 20, which is opposite to an end portion coupled to the lighting unit 10, is rotatably coupled to the base 30 by a hinge pin 21. Accordingly, the base 30 has a structure that is rotatable relative to the lighting unit 10 and the rotary body 20 (see FIG. 5A).

With a rotatable structure of the base 30, the lighting unit 10 and the rotary body 20 may be rotated toward one side or the other side in accordance with a subject surface such as a floor surface or a wall surface to which the base 30 is attached and supported, and as a result, an appearance of the multipurpose assistance lamp 1 may be variously implemented, as illustrated in FIG. 5B to 5E.

As illustrated in FIGS. 1 to 3, the base 30 is rotatably coupled to one side of the rotary body 20, and accommodates therein a circuit part 31 and a battery 32 for operating the OLED lighting sheet 11. As the battery 32, a Li-ion battery, which is used for a mobile phone and the like, may be used, such that a charging device for the mobile phone may be used.

In addition, a connector (not illustrated in the drawings) for supplying electric power to the Li-ion battery 32 is provided on the base 30, such that the multipurpose assistance lamp 1 may also be used in a state in which electric power is supplied through an electric wire from outside.

The bottom surface of the base 30 is in a surface-to-surface contact with a wall or a floor, such that the base 30 serves as a support or a support body of the multipurpose assistance lamp 1, and the base 30 may be formed as an injection-molded plastic. The base 30 may be fixed by inserting a wall nail through a through hole 30a.

In addition, as illustrated in FIG. 3, plate magnets 34 and 35 are provided inside and outside a bottom cover 33 of the base 30, such that the base 30 may be attached to an outside article made of steel.

Particularly, the outer plate magnet 35 may be provided to be separable from the base 30, such that the multipurpose assistance lamp 1 may be fixed to a tent by attaching the inner and outer plate magnets 34 and 35 to each other while interposing a thin film of the tent between the inner and outer plate magnets 34 and 35.

In a lighting unit 10' of a multipurpose assistance lamp according to a second exemplary embodiment of the present invention, a casing plate includes a back cover portion 14, and side frame portions 15, as illustrated in FIG. 6.

The back cover portion 14 is in a surface-to-surface contact with and supports a back surface (upper surface in the drawing) of the OLED lighting sheet 11, the side frame portions 15 are attached to both side surfaces at edges of a front surface (lower surface in the drawing) of the back cover portion 14, which face each other, and vertically protrude toward the front surface, and the side frame portions 15 are in contact with and support respective edges of the OLED lighting sheet 11 and the transparent film 12 at inner sides of the side frame portions 15 toward a front surface of the back cover portion 14.

Specifically, the side frame portions 15 have a cross section having a rotated 'T' shape, respectively, in which first vertical end portions 15a which are in direct contact with and support both edges of the back cover portion 14, second vertical end portions 15b which are in direct contact with and support both edges of the OLED lighting sheet 11, and third vertical end portions 15c which are in direct contact with and support both edges of the transparent film 12 are sequentially formed.

Furthermore, the side frame portion 15 is attached to an edge of the front surface of the back cover portion 14 by a first horizontal end portion 15d formed between the first vertical end portion 15a and the second vertical end portion 15b, and attached to an edge of the back surface of the transparent film 12 through a second horizontal end portion 15e formed between the second vertical end portion 15b and the third vertical end portion 15c.

Here, the back cover portion 14 may be made of stainless steel or carbon, and the side frame portion 15 may be formed as an injection-molded aluminum.

As illustrated in FIG. 7, a lighting unit 10" of a multipurpose assistance lamp according to a third exemplary embodiment of the present invention includes a transparent film 12' which is in surface-to-surface contact with a front surface of an OLED lighting sheet 11 while being stacked on the front surface of the OLED lighting sheet 11, and a casing plate 13' which accommodates and supports the OLED lighting sheet 11 and the transparent film 12' at sides of the casing plate 13'.

The transparent film 12' includes a front cover portion 12a' which is in a surface-to-surface contact with a front surface (bottom surface in the drawings) of the OLED lighting sheet 11, and side end portions 12b' which vertically protrude from both left and right side surfaces of the front cover portion 12a', to support the OLED lighting sheet 11 at sides of the side end portions 12b'.

The casing plate 13' includes a back cover portion 13a' which is in a surface-to-surface contact with a back surface (upper surface in the drawing) of the OLED lighting sheet 11, and side protruding end portions 13b' which vertically protrude from both side surfaces of the back cover portion 13a', which face each other, to support the side end portions 12b' at sides of the side protruding end portions 13b'.

Accordingly, the lighting unit 10" has a thickness of the structure that is configured with three layers: the OLED lighting sheet 11, the transparent film 12', and the casing plate 13', and as a result, the lighting unit, which is thinner than the lighting unit (10 in FIG. 4) of the first exemplary embodiment that adopts a slide assembly manner, may be implemented.

In this case, as illustrated in FIG. 7, a plurality of catching projections T protrude in a longitudinal direction of the side end portion 12b' of the transparent film 12', and catching recessed portions H are formed at positions of the side protruding end portion 13b' of the casing plate 13', which correspond to the plurality of catching projections T, such that the catching projections T and the catching recessed portions H may be fastened to each other when assembled.

Meanwhile, with a flexibility of the OLED lighting sheet as a lighting source, the multipurpose assistance lamp according to an embodiment of the present invention may be implemented to have a lighting unit 10 having a multi-curved surface, as illustrated in FIG. 8.

The aforementioned multipurpose assistance lamps are merely exemplary embodiments for understanding of the present invention, and it should not be understood that the scope or the technical scope of the present invention is limited to the aforementioned description.

The invention claimed is:

1. A multipurpose assistance lamp comprising:
a lighting unit which has an OLED lighting sheet having a curved surface, a transparent film having a curved surface that is in a surface-to-surface contact with a front surface of the OLED lighting sheet while being stacked on the front surface of the OLED lighting sheet, and a casing plate having a curved surface that accommodates and supports the OLED lighting sheet and the transparent film using left and right edges in a state in which the casing plate is in a surface-to-surface contact with a back surface of the OLED lighting sheet;
a rotary body which is coupled to one end portion of the lighting unit and supports the lighting unit; and
a base which is rotatably, hingedly coupled to the rotary body and accommodates therein a circuit part and a battery for operating the OLED lighting sheet,
wherein the lighting unit forms free end portions which are both end portions in a longitudinal direction which are exposed to outside, such that a finishing plug is fitted with and coupled to another end portion opposite to the one end portion coupled to the rotary body so as to reduce or prevent the OLED lighting sheet and the transparent film accommodated in the casing plate from being exposed to outside.

2. The multipurpose assistance lamp of claim 1, wherein the casing plate includes a back cover portion which is in a surface-to-surface contact with the back surface of the OLED lighting sheet, side protruding end portions which vertically protrude from both surfaces of the back cover portion which face each other, to support the OLED lighting sheet and the transparent film at sides of the side protruding end portions, and guide arm portions which are extended inward from the side protruding end portions so as to be parallel with a front surface of the back cover portion, and in contact with and support surfaces at edges of the transparent film.

3. The multipurpose assistance lamp of claim 1, wherein the casing plate includes a back cover portion which is in a surface-to-surface contact with the back surface of the OLED lighting sheet, and side frame portions which are attached to both edges of the back cover portion which at least face each other, and vertically protrude toward the front surface, and are in contact with and support respective edges of the OLED lighting sheet and the transparent film at inner sides of the side frame portions toward a front surface of the back cover portion.

4. The multipurpose assistance lamp of claim 3, wherein in the side frame portion, a first vertical end portion which is in direct contact with and supports a side edge of the back cover portion, a second vertical end portion which is in direct contact with and supports a side edge of the OLED lighting sheet, and a third vertical end portion which is in direct contact with and supports a side edge of the transparent film are sequentially formed.

5. The multipurpose assistance lamp of claim 4, wherein the side frame portion further has a first horizontal end portion which is formed between the first vertical end portion and the second vertical end portion, and attached to the edge of the front surface of the back cover portion, and a second horizontal end portion which is formed between the second vertical end portion and the third vertical end portion, and attached to the edge of the back surface of the transparent film.

6. The multipurpose assistance lamp of claim 1, wherein the transparent film includes a front cover portion that is in a surface-to-surface contact with the front surface of the OLED lighting sheet, and side end portions which vertically protrude from both side surfaces of the front cover portion which face each other, to support the OLED lighting sheet at sides of the side end portions, and the casing plate includes a back cover portion which is in a surface-to-surface contact with the back surface of the OLED lighting sheet, and side protruding end portions which vertically protrude from both side surfaces of the back cover portion which face each other, to support the side end portions at sides of the side protruding end portions.

7. The multipurpose assistance lamp of claim 6, wherein the side end portion of the transparent film has a plurality of catching projections that protrude in a longitudinal direction thereof, and the side protruding end portion of the casing plate has catching recessed portions formed at positions corresponding to the plurality of catching projections.

8. The multipurpose assistance lamp of claim 1, wherein the base has a magnetic body on a back surface thereof so that the base is attached to an outside article.

9. The multipurpose assistance lamp of claim 8, wherein the magnetic body includes an inside magnetic body and an outside magnetic body which are attached to inside and outside of the back surface of the base, respectively, and the outside magnetic body is detachably provided on the back surface.

* * * * *